(12) United States Patent
McDermott

(10) Patent No.: US 7,100,205 B2
(45) Date of Patent: Aug. 29, 2006

(54) SECURE ATTENTION INSTRUCTION CENTRAL PROCESSING UNIT AND SYSTEM ARCHITECTURE

(75) Inventor: John P. McDermott, Annandale, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/693,843

(22) Filed: Oct. 22, 2003

(65) Prior Publication Data

US 2005/0091516 A1 Apr. 28, 2005

(51) Int. Cl.
H04L 9/00 (2006.01)
G06K 9/00 (2006.01)

(52) U.S. Cl. ............... 726/22; 726/2; 726/26; 713/180; 713/190

(58) Field of Classification Search ........... 713/172, 713/175, 200; 380/247
See application file for complete search history.

(56) References Cited

U.S. PATENT DOCUMENTS 6,026,293 A * 2/2000 Osborn .................. 380/247
6,185,678 B1 2/2001 Arbaugh et al.
6,330,670 B1 12/2001 England et al.
6,789,199 B1 * 9/2004 Wilhelm, Jr. ............... 713/200
2003/0196111 A1 * 10/2003 Lampson et al. ........... 713/200
2004/0015694 A1 * 1/2004 DeTreville .................. 713/172
2004/0044906 A1 * 3/2004 England et al. ............. 713/200
2004/0054907 A1 * 3/2004 Chateau et al. ............. 713/175

* cited by examiner

Primary Examiner—Gilberto Barrón Jr.
Assistant Examiner—Abdulhakim Nobahar
(74) Attorney, Agent, or Firm—John J. Kahasek; Sally A. Ferrett

(57) ABSTRACT

A central processing unit comprising means for processing computer instructions. The Means for processing computer instructions includes means for receiving computer instructions and means for executing computer instructions. A secure memory unit is coupled to the processing means, and contains one or more resident security check programs therein. When the means for processing information receives a secure attention instruction through the receiving means the means for executing computer instructions interrupts the instructions it is executing, and executes the security check program by retrieving its instructions from the secure memory. The security check program returns the result of the check program. If the results are satisfactory, a cryptographic check key authenticates the result values transmitted to the source of the secure attention instruction. If the cryptographic check value is incorrect or non-existent, the source of the secure attention instruction is notified of a security problem.

23 Claims, 4 Drawing Sheets

SECURE ATTENTION INSTRUCTION CENTRAL PROCESSING UNIT AND SYSTEM ARCHITECTURE

FIELD OF THE INVENTION

This invention relates in general to computer architecture and in particular to a computer architecture that provides resistance to deceptive interpreters and promotes high levels of computer system integrity and security.

BACKGROUND OF THE INVENTION

Central processing units or CPU's are the key mechanisms in computer systems. CPU's, execute sequences of instructions that constitute computation. CPU's can be implemented as chips, or as a collection of chips and other components. Many forms of computer and network security incidents include tampering with the installed software. If tampering takes place, then network messages, computed results, audit records, maintenance commands, security management, and other functions are suspect. Current technology provides for manually initiated checks for tampering that are reasonably effective, but intrusive to carry out. Familiar forms of tampering include trapdoors, Trojan horse programs, and computer viruses.

Referring to the figures where like reference numbers denote like elements, FIG. 1 shows a computer system 100 using a conventional architecture. The central processing unit 105, interfaces with programs 120, 130 and 140 via an operating system 110. The operating system 110 retrieves authorized programs 120, 130 and 140 from some type of fixed medium and provides instructions for the CPU 105 to execute.

All checks for tampering face what is known as the problem of deceptive interpretation. Checks for tampering are made using computer programs, i.e. sequences of machine language instructions executed by the computer being checked, or responses to network messages that are the result of program execution. In a system that has been tampered with, it is straightforward to modify the operating system (or other software) so that the instructions that perform the checks are intercepted and bogus results returned.

The problem of deceptive interpretation is that, in the general case, no sequence of instructions can test the processor that executes those instructions, to confirm that the instructions are not being interpreted by some other processor (i.e. a malicious program in software) that is simulating what appears to be the correct processor (i.e. the hardware CPU chip).

FIG. 2 shows a computer system using a conventional architecture that has been compromised by a deceptive interpreter. As shown in FIG. 2, the deceptive interpreter, or malicious program 260, creates a layer 250 between the CPU 105 and the operating system 110 that effectively isolates the CPU 105 from security check software 140 or similar security related programming. The deceptive interpreter layer 250, is underneath the operating system 110 and thus a security program 140 that functions under the command of the operating system 110 can be "fooled" by the deceptive interpreter through conditioning the responses 106 from the CPU 105. By isolating the CPU 105, and "conditioning" any input received from or output transmitted 107 to the computer system, a deceptive interpreter can simulate a normally functioning CPU to the greater computer system.

Between each legitimate instruction simulated, the deceptive interpreter can perform an arbitrary number of its own unauthorized and often malicious instructions 260 without being detected by the human operator, the security check program 140, or other authorized programs 120, 130, being executed by the system. This principle is related to the problem of computer viruses and Trojan horses. Malicious software 260 can use this problem to avoid detection and prevent security checks 140 from discovering any unauthorized actions.

In the case of checks for tampering, current technology has the user insert some form of removable storage media that is capable of re-booting (i.e. stopping all of the running software and replacing it with a known good copy from the removable media) the system to be checked. The user can then press a keyboard key or button to force the hardware to re-boot from the removable media. This makes it extremely difficult for an attacker to interpose a deceptive interpreter between the checking program and the system to be checked.

The manual insertion of removable media and re-booting is time consuming, does not scale well to larger networks, and frustrates automated security management. There is a great deal of research and commercial interest in the application of autonomous mobile software agent technology to security management, intrusion detection, and security incident response. There is even more interest in general use of this technology. At present, agent technology cannot be used for security functions, because of the problem of deceptive interpretation. Agents are above the operating system and are therefore above a deceptive interpretation layer. An agent moving to a new computer to carry out its responsibilities cannot detect that it has been encapsulated by a deceptive interpreter. By passing false results to the agent, the deceptive interpreter can mislead the agent into incorrect behavior.

At present the two solutions to the deceptive interpreter problem are to either: 1) use manual insertion of removable media followed by re-boot, as just described, or 2) only run immutable programs that have been shown to be free from security flaws. Both of these approaches render agent technology unusable for security functions or general functions that require trust. Examples of the latter include financial, legal, and medical applications.

Human users of computers face a similar problem with Trojan horses and viruses. A human computer user cannot, in the general case, tell what instructions are being executed on a computer, just by looking at its display or other outputs. These outputs can be falsified. An example of this is password stealing via a false login screen. It is possible to tamper with a computer so that it displays a screen that looks like the legitimate login display, but actually emails the user's password to a malefactor before logging the user in. To combat this threat, users are given what is called a secure attention key. In its correct implementation, a secure attention key is a keyboard key that causes a distinguished signal to be sent directly to the computer's hardware CPU, thus bypassing all software running on the computer. The CPU is designed to carry out a known sequence of instructions that confirms the authenticity of the login (or other security relevant feature), whenever this distinguished signal is received.

Clearly, software agents cannot use this feature, since at best they must use machine language instructions to access a computer keyboard. Once again, these instructions are subject to deceptive interpretation which would omit the distinguished signal. Checks for software tampering are now more necessary than ever. One example would be the Tripwire system developed at Purdue University.

Tripwire calculates, records, and confirms checksums or digital signatures of files on the storage media of computer systems. The other possible form of check would be to inspect the image of the running software, i.e. the bit patterns representing the software in memory as it executes. There are limitations to this approach, because it is difficult to be confident that the tamper checks have not themselves been tampered with. The limitations are twofold:

1) the checks are dependent on whatever operating system is used to support the checking software, and 2) reasonably believable checks require human assistance in the form of rebooting the system and inserting special storage media that contains the checking software.

The rebooting is done to ensure that the operating system supporting the check is trustworthy; insertion or mounting of special media is done for the same reason: the special media is kept separate from the system to be checked and is thus unlikely to have been tampered with. High-assurance checks are thus manual and do not scale well to large networks.

Another approach for software tampering checks, or more specifically digital rights management, is Microsoft's Palladium initiative, renamed Next Generation Secure Computing Based for Windows. This approach is described in U.S. Pat. No. 6,330,670 held by Microsoft. The Palladium approach is to refuse to load programs into memory unless they have a digital signature provided by the owner of the digital-rights-managed data, e.g. Microsoft or Disney.

The mechanism by which this is done has three parts:

1) a cryptographic scheme that ensures that the computer only boots a correctly signed version of the operating system, including initialization of the second part, 2) a separate protected area of memory that cannot be tampered with, and 3) trusted software in the protected area of memory that performs digital signature and privacy encryption functions. The keys, algorithms, and implementation are all provided by the software manufacturers.

The first part, secure booting, is described in U.S. Pat. No. 6,185,678. The trusted software that runs in the protected memory is the component that checks signatures and decrypts programs before allowing them to be run. For digital rights management, it also runs programs supplied by content providers. The content provider programs (not part of the patent and also prior art) perform functions like playing music or videos only the authorized number of times for the paying user. The original problem with these content provider programs was that they could be tampered with. Palladium protects these content provider programs from tampering that would violate digital rights.

Palladium also now allows the hardware to be fingerprinted, by incorporating values read from the user's hardware, and using this fingerprint as part of the digital signature scheme. Privacy encryption services are provided to prevent copying of music, videos, programs, etc. While they are on a disk or other storage media. However, neither Tripwire nor Palladium address the problem of a system attack through deceptive interpretation.

Thus, a need exists for a system architecture that allows software to initiate software and system integrity checks that are resistant to deceptive interpretation.

SUMMARY OF THE INVENTION

A central processing unit comprising means for processing computer instructions. The means for processing computer instructions includes means for receiving computer instructions and means for executing computer instructions. A secure memory unit is coupled to the processing means, and contains one or more resident security check programs therein. When the means for processing information receives a secure attention instruction through the receiving means the means for executing computer instructions interrupts the instructions it is executing, and executes the security check program by retrieving its instructions from the secure memory. The security check program returns the result of the check program. If the results are satisfactory, a cryptographic check key authenticates the result values transmitted to the source of the secure attention instruction. If the cryptographic check value is incorrect or non-existent, the source of the secure attention instruction is notified of a security problem. This central processing unit may be employed in a computer system that includes additional computer readable medium coupled to the CPU through an OS program.

DETAILED DESCRIPTION

A secure attention instruction central processing unit (secure attention CPU) is a central processing unit that can perform secure attention instructions. When the secure attention instruction CPU encounters the operation code for a secure attention instruction, it performs a security check of its computer. If the security check indicates that the computer has not been tampered with, then the secure attention instruction CPU returns a cryptographically generated authentication value as the answer. The cryptographically generated value is based on a secret or private key held securely inside the secure attention instruction central processing unit. Otherwise, i.e. if the check indicates a security problem, the secure attention CPU returns a randomly generated number that is not the authentication value.

Any secure attention instruction is subject to deceptive interpretation. However, a deceptive interpreter will not be able to predict the cryptographically generated return value and simulate a report of no problems. A deceptive interpreter can simply omit execution of the secure attention instruction, but this omission will also be detectable outside the computer being checked.

Figure 1:
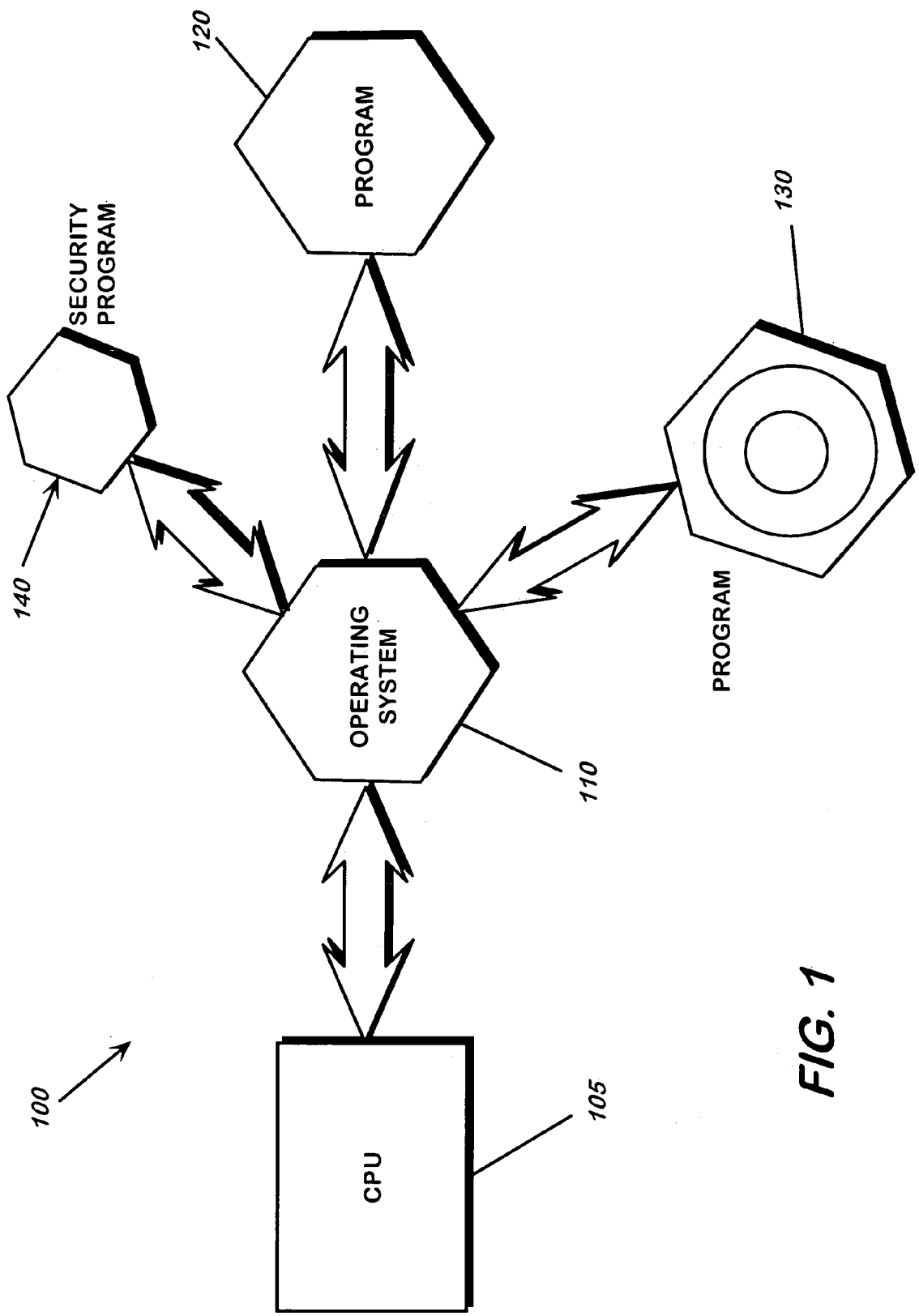
FIG. 1 shows a block diagram of a computer system employing a conventional architecture.
Figure 2:
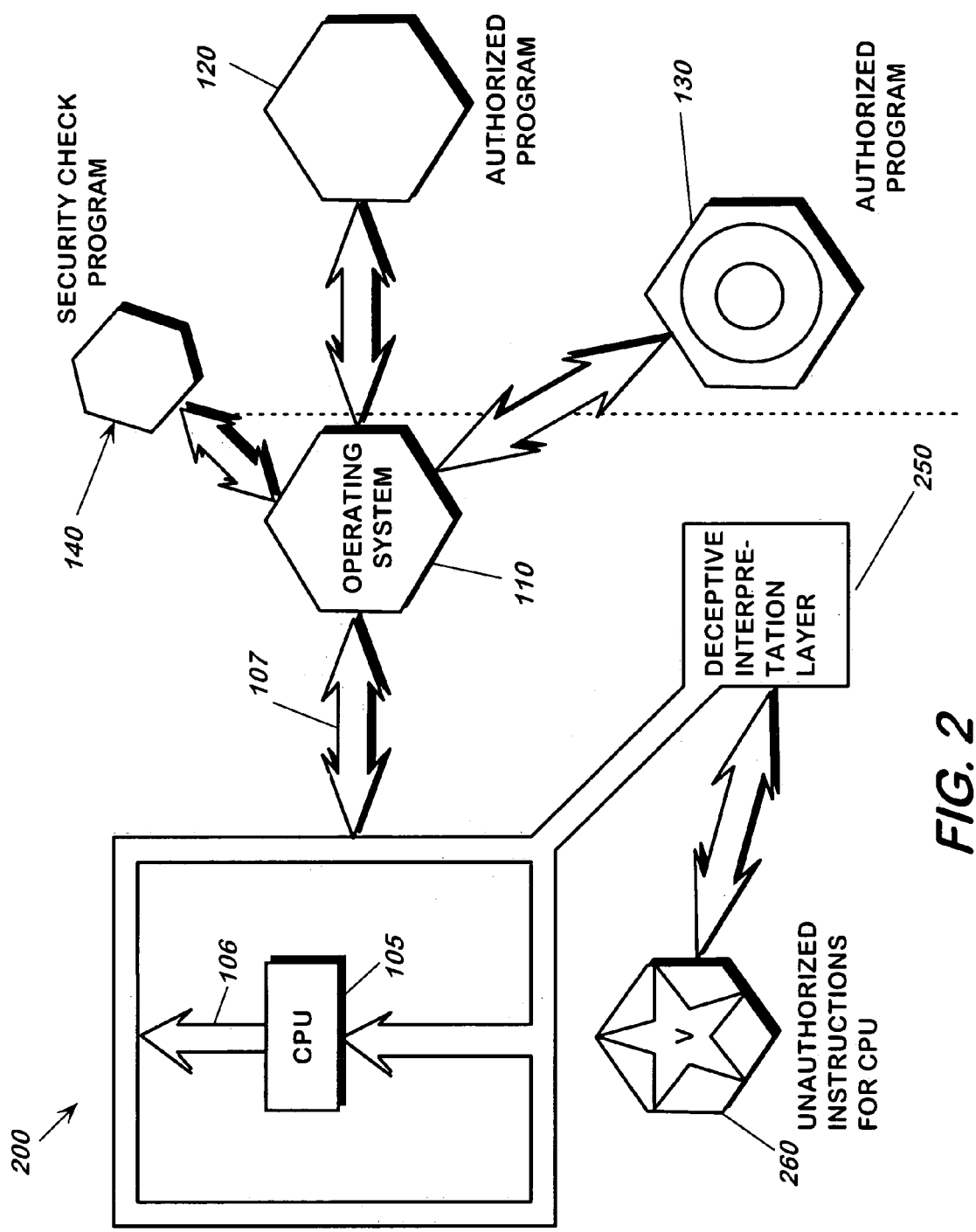
FIG. 2 show a block diagram of a computer system employing a conventional architecture that has been compromised by a deceptive interpertator.
Figure 3:
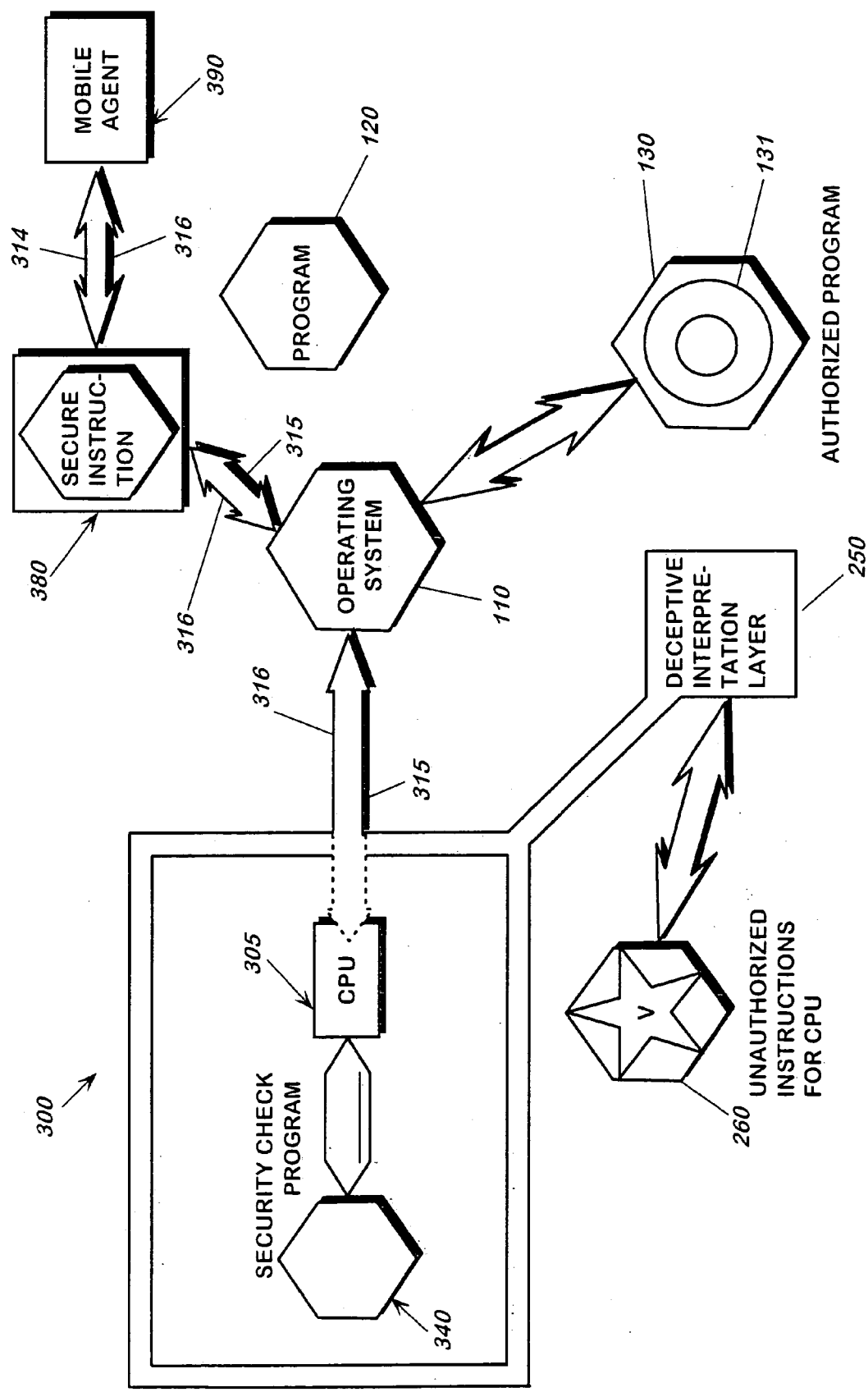
FIG. 3 shows a block diagram of a computer system employing a secure attention instruction CPU architecture.

FIG. 3 shows a block diagram of a computer system employing a secure attention instruction architecture under attack through deceptive interpretation.

The computer system 300 features a central processing unit (CPU) 305 for executing conventional instructions and secure attention instructions. A secure memory unit 340 is coupled to the CPU 305, and containing one or more check programs 341 therein. The secure memory unit 340 is configured to limit access to the check programs 341 to only the CPU 305 in the absence of a cryptographic key. A computer readable medium 130 is coupled to the CPU 305 through a first program 110.

A second program 131 contained on the computer readable medium 130 accessed by the CPU 305 through the first program 110. In the example embodiment shown in FIG. 3, the first program 1110 is an operating system and the second program 131 contains executable code. The computer readable medium 130 may be a memory storage unit that is fixed or removable in nature.

Upon the receipt 315 of a secure attention instruction 380 by the CPU 305, the CPU 305 interrupts the execution of all other instructions, and executes one or more check programs 341 from the secure memory unit 340. Upon completion of the check programs 341, the CPU 305 returns results of the check program 316 to the source of the secure attention instruction 390. The results of the security check program are authenticated with a cryptographic value.

FIG. 3 also illustrates how the secure attention instruction system is resistant to attacks from a deceptive interpreter. The deceptive interpreter will attempt to create a layer 250 between the CPU 305 and the operating system 110, to condition the commands 315 and responses 316 received and issued by the CPU 305. However a deceptive interpreter is unable to access to the security check programs 341, to replicate the cryptographic key, or create a deceptive interpreter layer 250 that is underneath the CPU's security programming 341. Thus, when the mobile agent 390 issues the secure attention instruction 314, the secure instruction 380 cannot be intercepted and simulated by the deceptive interpreter without being detected.

The secure attention instruction 380, when issued, calls a secure check program 341 that must be executed by the CPU 305 if the correct cryptographic authentication value is to be returned 316. If the instruction is intercepted by the deceptive interpreter layer 250, and the CPU 305 fails to execute the security program 341, the cryptographic authentication value will not be generated and returned 316 to the mobile agent 390.

Figure 4:
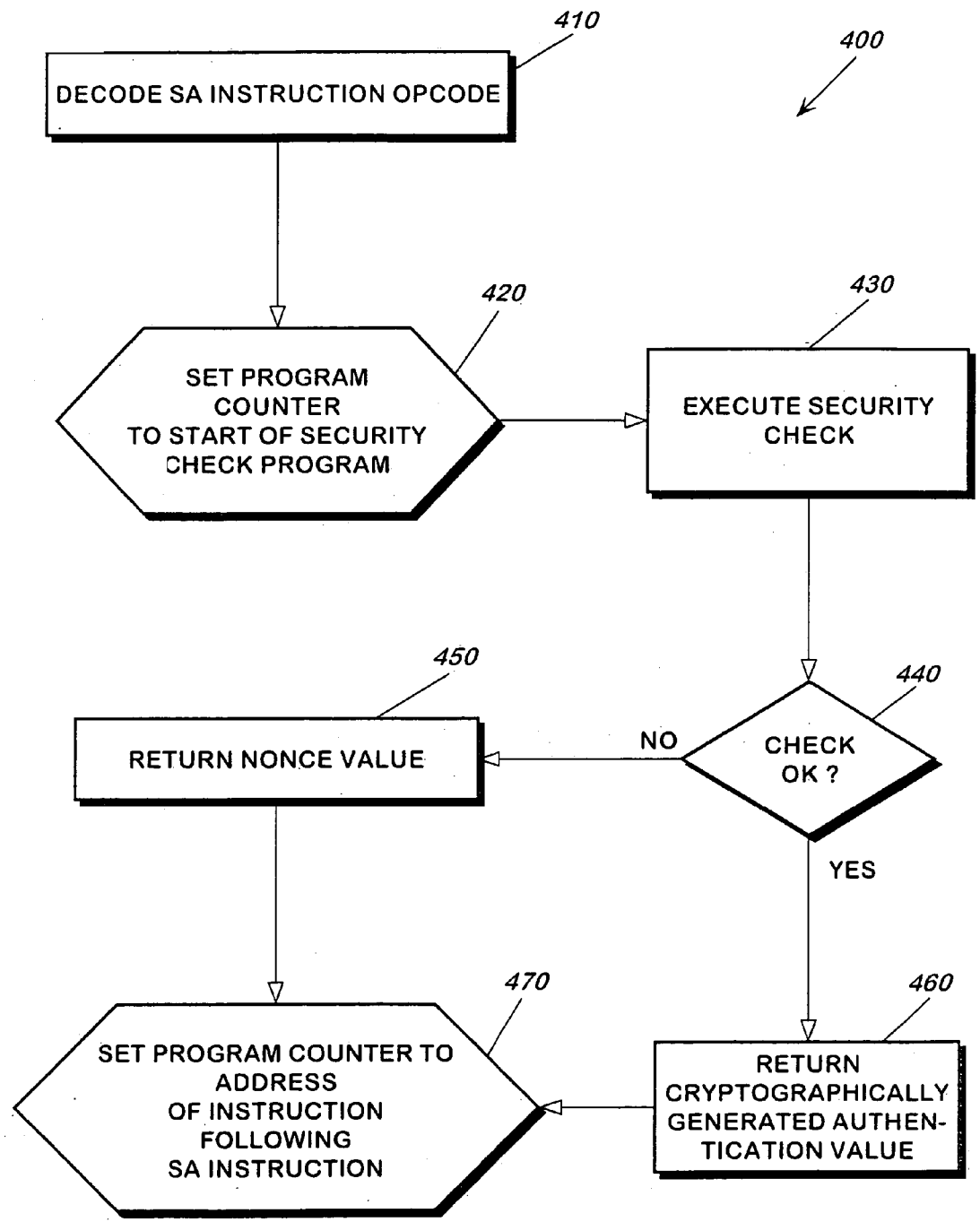
FIG. 4 shows a flowchart of the execution of a secure attention instruction by a computer system employing the secure attention instruction CPU architecture.

FIG. 4 shows a flowchart of an example secure attention instruction and how the CPU interrupts any existing task and executes the secure attention instruction. Referring to FIG. 4 and again to FIG. 3, the secure attention instruction 380 is issued by a mobile agent or other computer asset 390. The instruction is received 315 by the operating system 110 decoded and passed to the CPU 305 as a secure attention instruction opcode 410. The CPU will set a program counter to the start of the security check program 420 that is contained in the CPU's 305 secure memory 340 and execute one or more security checks 430. The results of the security checks are then evaluated 440, and if the results are acceptable a cryptographically generated authentication value is returned 460 by the CPU to the mobile agent.

If the results are not acceptable, the CPU will not return a cryptographically generated authentication value 450 to the mobile agent. The CPU may return a value to the mobile agent upon the finding of an unacceptable result, however the cryptographic authentication value will not be contained therein. The program counter is then set to the address of the instruction following the secure attention instruction 470.

It is unlikely that the deceptive interpreter can guess the correct cryptographic authentication value therefore a simulated response returned to the mobile agent will be unacceptable, alerting the greater system that the system has been compromised. If the deceptive interpreter layer 250 allows the secure attention instruction to pass, upon the execution of the security check program 341 the deceptive interpreter will be detected, because it is unable to modify the security check program 341 to ignore its presence and simulate an acceptable response. If the security check program finds the results of the executed security checks unacceptable, the value generated will not contain the cryptographic authentication value and will therefore be incorrect. The absence of a returned value is also an unacceptable result and will indicate a compromise of the system, thus the deceptive interpreter layer can't just ignore the secure attention instruction.

The intention of the security check is to ensure that only authorized, tamper-free software may be installed or executing, and that the configuration of the host must be correct according to the desired security policy. The extent and nature of the security check program may vary. The essential feature of the secure attention instruction CPU is that it will execute a program that is intended to check the security of the related computer, as part of executing a secure attention instruction. The security check program may check running software, images of the software as found on a hard disk or other peripheral devices. The security check program may halt running programs, including the operating system and it may change the security configuration of the host computer. The security check program may store copies of agents in its local memory and restart them in a trusted fashion.

Checks for software tampering can be quite extensive. They may require programs that are as complex as installation programs for operating systems. Any service needed for performing the checks must be provided by the checking software, unless there is a basis for believing the particular service is tamper proof. The security check program may need to not only access the disk images of its host, but also check the file systems and access the network. The security check program may be configured to establish a secure network connection and then download various checking modules from a trusted security management host or to report findings to it. Finally, the security check program may be an agent itself. In this case, the secure attention CPU would contain a rudimentary program that could install the agent from a trusted source.

In an example embodiment the secure attention instruction issued by an external source and received by the CPU through the first program. This external source issuing the secure attention instruction is preferably a mobile software agent that originates from a secure computer system. A human user, for example a security administrator, can run a program or invoke a mobile software agent that is known to contain a secure attention instruction. If the human user (or more likely, a trustworthy program operating on the human's behalf, outside the host being checked) knows the secret key inside the secure attention central processing unit, then the human user can predict or check the cryptographically generated number that resulted from the security check induced by the instruction. If the number is incorrect, there is a high probability that the security check was not successful.

The specific security checks are done by software or firmware programs in the secure memory. The secure memory is accessible to the secure attention CPU while it is executing the security checks or performing authorized changes to the software protected in the secure memory. The secure memory cannot be accessed from the operating system or any other software on the computer system. There are many ways of making the secure memory inaccessible; for example, the secure memory could be implemented inside the CPU as registers just like those used for cache memory. In an alternative embodiment, the secure memory could be implemented as a separate chip connected to the secure attention CPU by a private bus; the private bus only being active during the execution of a secure attention instruction. Since the security check programs are in a separate secure memory, it will be very difficult for deceptive interpreters or other malicious software to tamper with them.

Management of the security check programs, i.e. making authorized changes to them, can be controlled in several ways. In one example embodiment, management access could be controlled by a cryptographic protocol similar to a public key infrastructure. In an alternative embodiment, changes could be made by temporarily connecting another computer system to a physical connector to the secure memory, and making changes through that connection.

An advantage of the secure attention instruction CPU is that a user supplied program can now check a computer system for tampering, without being subject to deceptive interpretation. Computer systems without a secure attention instruction CPU cannot be checked remotely or automatically by a program, with any degree of confidence. Instead, a manually assisted check must be performed. With secure attention instruction CPU's in use, a single person can now check hundreds or even thousands of computer systems using software. The checks can be performed by autonomous mobile software agents. Widespread use of autonomous mobile software agents is now possible, with a secure attention instruction CPU on each potential host computer. The agents could have been used before, but there would be little confidence in their effect or results.

Another feature of this secure attention instruction CPU is its ability to initiate a security check as a result of an instruction or interrupt caused by a computer program and that the security check is not subject to deceptive interpretation or tampering. If the interrupt or instruction causes a security check and the results of the check are authenticated by a cryptographically generated value, then the instruction is a secure attention instruction.

The reason the security check performed by a secure attention instruction is not subject to deceptive interpretation or tampering is that the result of the security check is authenticated by a cryptographically generated value produced by the secure attention instruction CPU, and the security check program is not accessible to other programs or unauthorized users.

Another advantage particularly significant for high-assurance applications such as military, financial, medical, and power distribution systems, is that manual security checks on systems without a secure attention instruction are still subject to sophisticated forms of deceptive interpretation. If a malefactor can tamper with a host computer's operating system, that operating system can be altered to always re-boot with a deceptive interpreter. The ultimate check would still have to be that the underlying CPU could return a cryptographically generated value that could not be guessed by the deceptive interpreter. This requires a secure attention instruction.

In the preferred embodiment of the secure attention instruction CPU, the secure memory unit is accessible via an external connection that bypasses the CPU and all other parts of the secure computer system for the purposes of managing the check programs. Upon the presentation of a cryptographic key the secure memory unit is accessible via an external connection that bypasses the CPU and all other parts of the secure computer system for the purposes of managing the check programs. Thus, a system administrator, who has access to the physical machine through the external connection, may manage the contents of the secure memory unit, change cryptographic keys, add new checks, update old ones, etc.

The essence of a computer system employing the above described secure attention instruction architecture is a secure attention instruction CPU. The secure attention instruction central processing unit features means for processing computer instructions that includes means for receiving computer instructions and means for executing computer instructions.

A secure memory unit is coupled to the processing means, the secure memory unit has one or more resident security check programs contained therein. The security check programs comprises a cryptographic check key, and upon the execution of the security check program if the result of the check program is satisfactory, the cryptographic check key is used to authenticate the result values transmitted to the source of the secure attention instruction. The means for executing computer instructions is a processor or a combination of multiple processors configured to execute computer instructions. The means for receiving computer instructions is a system bus or similar component. When the means for processing information receives a secure attention instruction, through the receiving means, the means for executing computer instructions interrupts the instructions it is executing, and executes the security check program by retrieving its instructions from the secure memory.

Generally, access to the secure memory unit coupled to the processing means is restricted to the processing means in the absence of a cryptographically validated administrative secure attention instruction.

There are several alternatives methods for implementing a secure attention instruction CPU. The hardware that implements the secure attention instruction CPU can be as varied as the hardware used to implement other types of CPU's, e.g. microcode, programmable logic arrays, or discrete component logic. The method of invoking the secure attention instruction can be either an operation code fetched from an instruction stream by the secure attention instruction CPU or the secure attention instruction can be invoked by an interrupt generated by the CPU itself.

The specific cryptographic algorithm used to generate the authentication value may vary. The effectiveness of the authentication will vary with the algorithm, but the particulars do not change the fundamental nature of the secure attention instruction CPU.

The method of installing the secret key may vary. It may be entered manually or it may be transmitted to the secure attention instruction CPU by a bootstrap program. It may also be transmitted over a network, during the security check. There are several key management schemes that may be used to transmit the keys securely.

The manner in which the cryptographically generated authentication value is returned may vary. It may be returned in a general purpose register, in the primary memory of the host computer, or in a special purpose register.

In an example embodiment, the authentication value can be implemented as a Blum-Blum-Shub (BBS) generator. Since security checks of network hosts are not likely to occur very frequently, the computational expense of the BBS algorithm is not an issue. In principle, the strength of its unpredictability is not really an issue either, since a deceptive interpreter will have only one chance to guess an authentication value. On the other hand, use of the BBS algorithm will provide protection from unforeseen attacks that might allow a deceptive interpreter to evade checks protected by a simpler authentication value scheme. The problem of values to be supplied when a security check fails is also an issue. These values should be indistinguishable from the authentic value. Otherwise, a deceptive interpreter could allow the check to be run, but then take steps to protect itself if it was detected. The preferred way to do this is to have a second BBS generator, with a different seed value.

Reasonable management requirements for a secure attention instruction include not only the need to manage the sequence generation but also to manage the security check program. Security check programs may need upgrades or configuration changes and these should only be done via cryptographically protected communication with a trusted security management host. Finally, it may be useful to have the security check program report its results, i.e. the exact nature of any problem found, to a trusted security management host, via a protected communication. There are many approaches to establishing authenticated session keys between the secure attention CPU and a trusted security management host. The strength of the particular mechanism chosen in a particular implementation is matched to the assurance desired for the system being checked.

Secure attention instructions assume a significant amount of secure memory. The memory used to generate the authentication values must be protected from observation or modification by the malicious interpreter. In some cases, it may be necessary to protect the memory holding the security check program. In other cases, the security check need not be hidden but it will still be useful to do so. There are several ways of implementing this. The most straightforward way is to provide the secure memory as part of the CPU itself. This would be a very general solution that suited a large but very general market.

Other alternatives include implementing the secure memory and checking as a co-processor. This is less expensive, since it requires less change to existing CPU's. A third approach is to build a circuit card that carries a conventional CPU chip, but interposes the necessary logic and secure storage to bridge between the chip and the rest of the system. The chief benefit of this "hardware wrapper" approach is that it can be implemented for specific groups of users, and to higher levels of assurance than more general approaches.

Although this invention has been described in relation to the exemplary embodiment's thereof, it is well understood by those skilled in the art that other variations and modifications can be affected on the preferred embodiment without departing from scope and spirit of the invention as set fourth in the claims.

The invention claim is:

1. A central processing unit comprising:
   means for processing computer instructions comprising means for receiving computer instructions and means for executing computer instructions;
   a secure memory unit coupled to said processing means, said secure memory unit having one or more resident security check programs for identifying whether the computer has been tampered with;
   said means for processing information arranged to receive a secure attention instruction from a source through said receiving means and thereafter said means for executing computer instructions executes the security check program by retrieving its instructions from the secure memory,
   wherein if a deceptive interpreter is not present, the means for processing information retrieves and executes the at least one security check program, evaluates the results of the security check program, and transmits the results of the security check program and a cryptographically generated authentication value to the source,
   wherein if a deceptive interpreter, the computer processor will not retrieve and execute the security check program and will not transmit a correct authentication value to the source.
   and wherein an incorrect or absent authentication value indicates the presence of a deceptive interpreter.

2. The central processing unit of claim 1 wherein said means for receiving computer instructions is a system bus.

3. The central processing unit of claim 1 wherein said means for executing computer instructions is at least one processor.

4. The central processing unit of claim 1 wherein access to said secure memory unit coupled to said processing means is restricted to the processing means in the absence of a cryptographically validated administrative secure attention instruction.

5. The central processing unit of claim 1 wherein said security check programs comprises a cryptographic check key, and upon the execution of the security check program if the result of the check program is satisfactory, the cryptographic check key is used to authenticate the result values transmitted to the source of the secure attention instruction.

6. The central processing unit of claim 4 wherein said security check programs comprises a cryptographic check key, and upon the execution of the security check program if the result of the check program is satisfactory, the cryptographic check key is used to authenticate the result values transmitted to the source of the secure attention instruction.

7. The central processing unit of claim 4 wherein the secure attention instruction is issued by an external source and received by the CPU through a first program.

8. The central processing unit of claim 7 wherein the secure attention instruction is issued by a mobile software agent that executes on a secure computer system.

9. The central processing unit of claim 6 wherein the secure attention instruction is issued by an external source and received by the CPU through the first program.

10. The central processing unit of claim 9 wherein the secure attention instruction is issued by a mobile software agent that executes on a secure computer system.

11. The system according to claim 1, wherein the security check programs determine whether at least one of malicious instructions, viruses, deceptive interpreters, and Trojan horses is present.

12. A secure computer system comprising:
   a central processing unit (CPU) for executing conventional instructions and secure attention instructions;
   a secure memory unit coupled to the CPU, the secure memory unit containing one or more check programs therein, the memory unit is configured to limit access to the check programs to only the CPU in the absence of a cryptographic key;
   a computer readable medium coupled to the CPU through a first program,
   a second program contained on the computer readable medium accessed by the CPU through said first program;
   wherein upon the receipt of a secure attention instruction by the CPU,
   if a deceptive interpreter is not present, the CPU retrieves and executes the at least one security check program, evaluates the results of the security check program, and transmits the results of the security check program and a cryptographically generated authentication value to the source, and if a deceptive interpreter is present, the computer processor will not retrieve and execute the security check program and will not transmit a correct authentication value to the source, and wherein an incorrect or absent authentication value indicates the presence of a deceptive interpreter.

13. The secure computer system of claim 12 wherein the first program is the operating system alternatively the secure memory unit is accessible via an external connection that bypasses the CPU and all other parts of the secure computer system for the purposes of managing the check programs.

14. The secure computer system of claim 13 wherein the secure attention instruction is issued by an external source and received by the CPU through the first program.

15. The secure computer system of claim 14 wherein the secure attention instruction is issued by a mobile software agent that executes on a secure computer system.

16. The secure computer system of claim 12 wherein the computer readable medium is a memory storage unit.

17. The secure computer system of claim 16 wherein the second program contains executable code.

18. The secure computer system of claim 12 wherein the secure memory unit is accessible via an external connection that bypasses the CPU and all other parts of the secure computer system upon the completion of a cryptographic authentication protocol.

19. A central processing unit comprising:
 means for processing computer instructions comprising means for receiving computer instructions and means for executing computer instructions;
 a secure memory unit coupled to said processing means, said secure memory unit having one or more resident security check programs therein;
 wherein said means for processing information is arranged to receive a secure attention instruction through said receiving means from a source, said means for executing computer instructions is adapted to execute the security check program by retrieving its instructions from the secure memory, the security check program determining whether the computer has been tampered with;
 wherein if a deceptive interpreter is not present, the processing means retrieves and executes the at least one security check program evaluates the results of the security check program, and transmits the results of the security check program and a cryptographically generated authentication value to the source,
 wherein if a deceptive interpreter is present, the processing means will not retrieve and execute the security check program and will not transmit a correct authentication value to the source,
 and wherein an incorrect or absent authentication value indicates the presence of a deceptive interpreter.

20. A method for determining whether a computer has been tampered with by a deceptive interpreter, comprising:
 a computer processor receiving a secure attention instruction from a source external to the processor and transferring the secure attention instruction to a secure memory unit coupled to the computer processor, the secure memory unit having at least one security check program,
 wherein if a deceptive interpreter is not present, the computer processor retrieves and executes the at least one security check program, evaluates the results of the security check program, and transmits the results of the security check program and a cryptographically generated authentication value to the source,
 wherein if a deceptive interpreter is present, the computer processor will not retrieve and execute the security check program and will not transmit a correct authentication value to the source,
 and wherein an incorrect or absent authentication value indicates the presence of a deceptive interpreter.

21. The method according to claim 20, further comprising:
 the source transmitting the secure attention instruction to the computer processor.

22. The method according to claim 20, wherein the source is an autonomous mobile software agent.

23. The method according to claim 20, further comprising:
 the computer processor interrupting execution of other instructions after receipt of the secure attention instruction.

* * * * *

UNITED STATES PATENT AND TRADEMARK OFFICE
CERTIFICATE OF CORRECTION

| | | |
|---|---|---|
| PATENT NO. | : 7,100,205 B2 | Page 1 of 1 |
| APPLICATION NO. | : 10/693843 | |
| DATED | : August 29, 2006 | |
| INVENTOR(S) | : John P. McDermott | |

It is certified that error appears in the above-identified patent and that said Letters Patent is hereby corrected as shown below:

Title Page,
Item (74): Attorney, Agent, or Firm should read as: -- John J. Karasek; Sally A. Ferrett --

Signed and Sealed this

Twenty-eighth Day of November, 2006

JON W. DUDAS
*Director of the United States Patent and Trademark Office*